United States Patent
Thomas, Jr.

(10) Patent No.: US 10,209,353 B2
(45) Date of Patent: Feb. 19, 2019

(54) BANDWIDTH ENHANCEMENT BEAMFORMING

(71) Applicant: SRC, Inc., North Syracuse, NY (US)

(72) Inventor: Daniel D. Thomas, Jr., Baldwinsville, NY (US)

(73) Assignee: SRC, INC., North Syracuse, NY (US)

( * ) Notice: Subject to any disclaimer, the term of this patent is extended or adjusted under 35 U.S.C. 154(b) by 272 days.

(21) Appl. No.: 14/716,765

(22) Filed: May 19, 2015

(65) Prior Publication Data

US 2016/0341815 A1 Nov. 24, 2016

(51) Int. Cl.
*G01S 13/02* (2006.01)
*G01S 13/42* (2006.01)
*H04B 7/0408* (2017.01)

(52) U.S. Cl.
CPC ........ *G01S 13/0209* (2013.01); *G01S 13/426* (2013.01); *H04B 7/0408* (2013.01); *G01S 2013/0254* (2013.01)

(58) Field of Classification Search
CPC ............... G01S 13/0209; G01S 13/426; G01S 2013/0254; H04B 7/0408
USPC ......................................................... 342/81
See application file for complete search history.

(56) References Cited

U.S. PATENT DOCUMENTS

| | | | |
|---|---|---|---|
| 5,389,939 A | 2/1995 | Tang et al. | |
| 5,921,932 A * | 7/1999 | Wright | G01S 15/8979 600/447 |
| 6,208,285 B1 * | 3/2001 | Burkhardt | G01S 7/2921 342/132 |
| 6,538,603 B1 | 3/2003 | Chen et al. | |
| 6,741,207 B1 | 5/2004 | Allison et al. | |
| 6,897,829 B2 | 5/2005 | Oliver et al. | |
| 7,262,744 B2 | 8/2007 | Zaghloul et al. | |
| 7,315,276 B1 | 1/2008 | Rihaczek et al. | |
| 7,333,046 B2 | 2/2008 | Perry et al. | |
| 7,345,629 B2 | 3/2008 | Dulmovits, Jr. et al. | |
| 7,352,325 B1 | 4/2008 | Floyd et al. | |
| 8,149,166 B1 | 4/2012 | Buxa | |
| 8,803,732 B2 | 8/2014 | Antonik et al. | |

(Continued)

FOREIGN PATENT DOCUMENTS

| | | |
|---|---|---|
| CN | 101277139 | 10/2008 |
| EP | 0618641 | 10/1994 |

(Continued)

OTHER PUBLICATIONS

He et al. "Keystone transform based range-Doppler processing for human target in UWB radar", Radar Conference, 2014 IEEE, Publication Year: 2014, pp. 1347-1352 (accessed Mar. 15, 2015).

(Continued)

*Primary Examiner* — Frank J McGue
(74) *Attorney, Agent, or Firm* — Bond Schoeneck & King, PLLC; George McGuire

(57) ABSTRACT

A system and method for phased-array radar that is capable of accurate phase-only steering at any unambiguous angle is provided. In various embodiments, system and method that compensates for the varying effective element spacing of phased array radar, which occurs as a result of transmitting a wideband signal with phase shifters operating at a fixed phase, by interpolating and resampling across all elements, per frequency, to generate a desired effective spacing between the elements.

18 Claims, 7 Drawing Sheets

(56) References Cited

U.S. PATENT DOCUMENTS

| | | | |
|---|---|---|---|
| 8,854,255 B1 | 10/2014 | Ehret | |
| 8,934,774 B2 | 1/2015 | Yi et al. | |
| 9,712,225 B2* | 7/2017 | Takano | H04B 7/0868 |
| 9,864,045 B2* | 1/2018 | Fairley | G01S 7/288 |
| 2003/0076899 A1* | 4/2003 | Kumar | H04L 5/06 |
| | | | 375/316 |
| 2009/0239551 A1* | 9/2009 | Woodsum | H04B 7/086 |
| | | | 455/456.1 |
| 2014/0220914 A1* | 8/2014 | Nabar | H03G 3/3042 |
| | | | 455/127.3 |
| 2015/0198702 A1* | 7/2015 | Kim | G01S 13/0209 |
| | | | 342/21 |
| 2015/0293209 A1* | 10/2015 | Fairley | G01S 13/449 |
| | | | 342/21 |
| 2015/0355320 A1* | 12/2015 | Kim | G01S 13/0209 |
| | | | 342/21 |
| 2016/0197660 A1* | 7/2016 | O'Keeffe | H01Q 1/246 |
| | | | 370/329 |
| 2016/0341815 A1* | 11/2016 | Thomas, Jr. | H04B 7/0408 |
| 2017/0170890 A1* | 6/2017 | Takano | H04B 7/0868 |
| 2018/0128915 A1* | 5/2018 | Lomnitz | G01S 13/9005 |

FOREIGN PATENT DOCUMENTS

| | | |
|---|---|---|
| EP | 1597793 | 11/2005 |
| WO | 2004077607 | 9/2004 |

OTHER PUBLICATIONS

Kishimoto et al. "A 60-GHz band CMOS phased array transmitter utilizing compact baseband phase shifters", Radio Frequency Integrated Circuits Symposium, 2009. RFIC 2009. IEEE, DOI: 10.1109/RFIC.2009.5135525, Publication Year: 2009 , pp. 215-218. (accessed Mar. 15, 2015).

Zhu et al. "A Keystone Transform Without Interpolation for SAR Ground Moving-Target Imaging", Geoscience and Remote Sensing Letters, IEEE, vol. 4, Issue: 1, DOI: 10.1109/LGRS.2006.882147, Publication Year: 2007 , pp. 18-22 (accessed Mar. 15, 2015).

Dr. P.K. Sanyal, et al, Detecting Moving Targets in SAR Via Keystoning and Phase Interferometry, pp. 1-6, 2005 The MITRE Corporation, Rome, NY.

P.K. Sanyal, et al, Detecting Moving Targets in SAR via Keystoning and Multiple Phase Center Interferometry, pp. 1-6, The MITRE Corp., Rome, NY.

P.K. Sanyal, et al, Tracking Moving Ground Targets from Airborne, SAR via Keystoning and Multiple Phase Center Interferometry, pp. 1-6, The MITRE Corp., Rome, NY.

P.K. Sanyal, et al, Detecting and Geo-locating Moving Ground Targets in Airborne QuickSAR via Keystoning and Multiple Phase Center Interferometry, pp. 1-11, The MITRE Corp., Rome, NY.

Dr. D.M. Zasada, et al, Detecting Moving Targets in Multiple-Channel SAR via Double Thresholding, pp. 1-7, The MITRE Corp., Rome, NY.

D.P. McGarry, et al, Using a Clustering Technique for Detection of Moving Targets in Clutter-Cancelled Quicksar Images, pp. 1-5, The MITRE Corporation, Rome, NY.

P.K. Sanyal, et al, Computational Burden in Moving Target Detection in Multi-Channel SAR using Phase Interferometry, pp. 1-4, The MITRE Corp., Rome, NY.

R.P. Perry, et al, SAR Imaging of Moving Targets, pp. 0-13, IEEE Transactions on Aerospace and Electronic Systems vol. 25, No. 1, Jan. 1999, The MITRE Corporation, Bedford, MA.

\* cited by examiner

BANDWIDTH ENHANCEMENT BEAMFORMING

FIELD OF THE INVENTION

The present invention is directed generally to systems and methods for wideband beamsteering and more particularly to a system and method to permit phase-only steering of a wideband signal.

BACKGROUND

Phased array radar systems employ a bank of antennas, arranged in a particular orientation, each emitting a signal that is phase-adjusted to construct a radiation pattern in a desired direction. Phased arrays often use antennas having a fixed phase-relationship to generate a signal in one direction. Other phased arrays adjust the phase of each antenna to steer the beam in different directions.

Wideband radar systems are highly desirable, as they offer the increased ability to discriminate and identify a target. However, current phased arrays cannot be steered, using only phase, over wide bandwidths. This is because the phase shifters at a fixed phase will only be accurate for one frequency within the frequency spectrum transmitted. In other words, if the phase is fixed, the direction of the beam will shift over frequency and even small changes in frequency can effectively mispoint the phased array. Further, for very narrow wideband pulses, the returns across the array will not align in time and so cannot be added coherently. Ideally, wideband beam steering of phased arrays could be accomplished through time delay steering, instead of phase shifters. Instead of adjusting for phase difference, the time delay units adjust for the difference in time of arrival at each element. But time delay units are still too large and expensive to be practically implemented. Accordingly, there is a need in the art for phased-array radar that is capable of phase-only steering, at any unambiguous angle (i.e. out to the first grating lobe) for wideband signals.

SUMMARY OF THE INVENTION

The present disclosure is directed to systems and methods for phased-array radar that is capable of accurate phase-only steering at any unambiguous angle. In various embodiments, the disclosure provides a system and method that compensates for the varying effective element spacing as a fraction of wavelength, which occurs as a result of transmitting a wideband signal with phase shifters operating at a fixed phase, by interpolating and resampling across all elements, per frequency, to generate a desired effective spacing between the elements. The resulting data may be then be transformed to the time-domain and used for phase-only beam steering, without the effects of beam broadening that results from the wideband signal.

BRIEF DESCRIPTION OF THE DRAWINGS

The various embodiments of the invention will be better understood when read in conjunction with the following drawings.

DETAILED DESCRIPTION OF THE EMBODIMENTS

Figure 1:
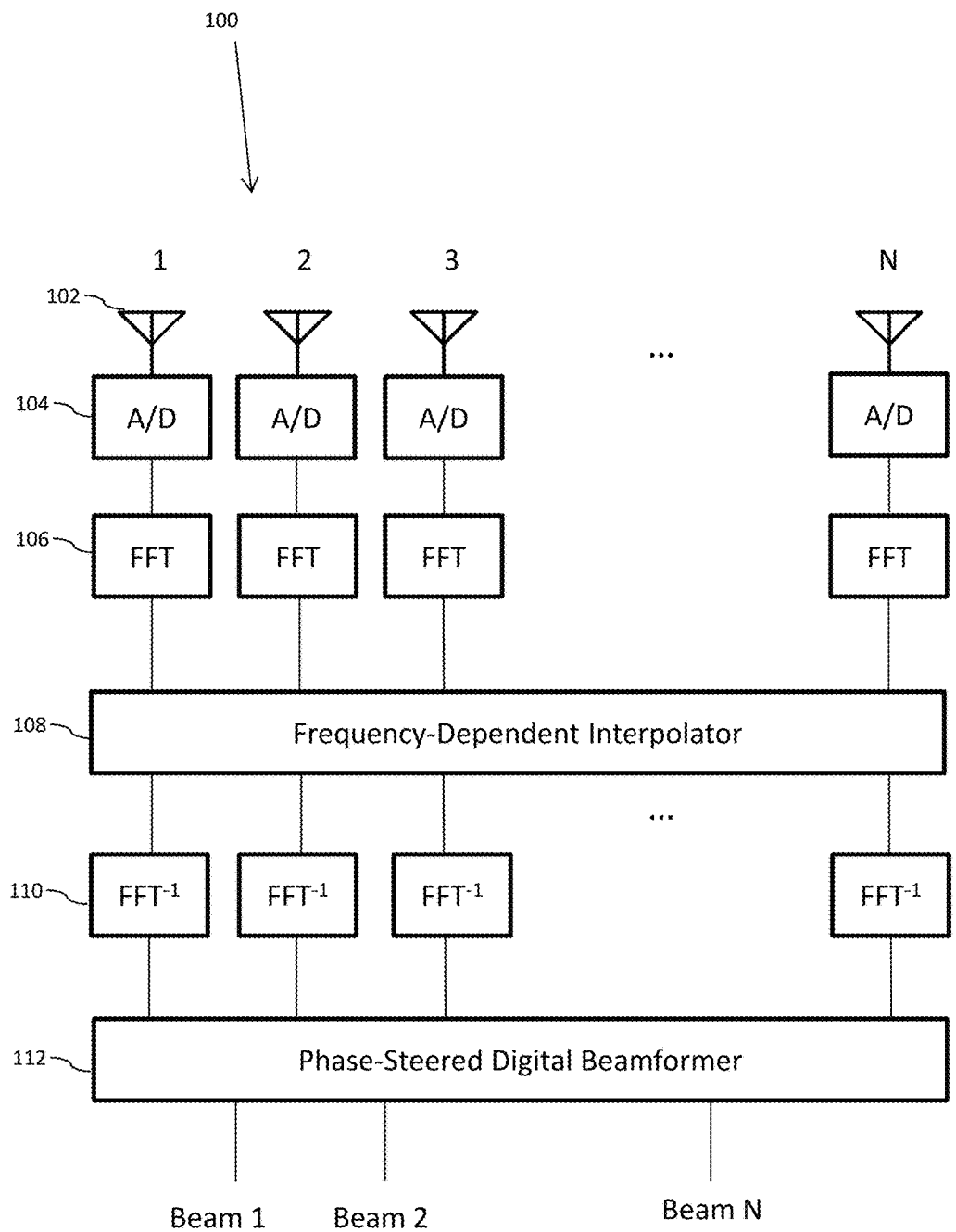
FIG. 1 shows a schematic of a system that permits phase-only steering of a wideband signal according to an embodiment.

Referring now to the drawings wherein like reference numerals refer to like parts throughout, there is seen in FIG. 1, a system 100 capable of phase-only steering of a wideband signal. In an exemplary embodiment, system 100 comprises a plurality of antenna elements 102 arranged in a predetermined orientation to form a phased-array antenna. Elements 102 may be configured to receive wideband signals, which exhibit an effective spacing (in units of wavelength) between elements 102 that varies across frequency. One of ordinary skill in the art will appreciate that, although not shown, each element may have an associated phase shifter for adjusting the outputted phase to steer the beam in a desired direction. Each element may further have an associated receiver to amplify the signal received at each element 102. System 100 may further comprise a plurality of A/D converters 104, configured to digitize the signals received by elements 102. The received signals, once amplified and digitized, may be stored for further processing.

System 100 may further comprise a plurality of Digital Fourier Transform (DFT) modules 106 (shown in FIG. 1, in an exemplary embodiment, as Fast Fourier Transform (FFT) modules) configured to receive a predetermined portion of the digitized signals. In an exemplary embodiment, the portion received by the DFT modules 106 may be a pulse repetition interval; however other intervals, such as a fixed time interval, may be used.

System 100 may further comprise a plurality of correlators (not shown), configured to compress the signal to recover an unmodulated pulse signal, with some bandwidth. In an alternate embodiment the correlators may be located elsewhere, such as after the inverse DFT modules 108.

System 100 may further comprise a frequency-dependent interpolator 108. Frequency dependent interpolator 108 may receive the collective output from DFT modules 106. This collective output may be thought of as a frequency-by-element matrix. Frequency-dependent interpolator 108 may be configured to interpolate and resample, per frequency, across the elements, to recreate a desired effective spacing as a fraction of a wavelength between elements 102. Frequencies located higher than the center frequency will exhibit an equivalent element spacing that is closer together, while frequencies lower than the center frequency will be spaced farther apart. Accordingly, across the DFT module 106 outputs, the frequency bins higher than the reference frequency of the received signal will be interpolated and resampled at a faster rate to "spread the elements out" and the frequency bins lower than the center frequency will be interpolated and resampled at a slower rate to shrink the effective distance between the elements. In this way, each frequency bin across the DFT 106 outputs may be interpolated to correct the effective element spacing as a fraction of a wavelength. One of ordinary skill will appreciate that any effective element spacing may be selected, such as a half a wavelength.

To illustrate, a particular frequency bin, say the frequency bins located at 500 MHz of each DFT module 106 output, will be interpolated to create a set of data points "between" the elements. These created data points represent estimated frequency bin values at those points spatially between the elements. From these created data points, data points at certain locations will be selected, according to the frequency bins' relative distance from the reference frequency, to virtually resample the signal at appropriate points between the actual elements. These points between the elements are specifically selected to return the effective element spacing back to a desired distance at that frequency. The points are selected according to the following equation:

$$x = \left(\frac{f_o}{f + f_o}\right) x'$$

Where x is the actual element spacing (the equations here assume a one-dimensional array, but one of ordinary skill will understand that it may be extended to two-dimensions), x' represents the interpolated and resampled element desired spacing, $f_0$ is the user-defined reference frequency of the signal and f is a selected frequency from each Fourier transform output.

One of ordinary skill in the art will also appreciate that any number of interpolation algorithms may be used to estimate values between the received samples. For example, in an exemplary embodiment, cubic spline interpolation may be used.

System 100 may further comprise a plurality of inverse DFT modules 110 (FFT in the embodiment shown in FIG. 1) to convert the output of the frequency-dependent interpolator 108 back into the time domain. In an alternate embodiment, system 100 may not have any inverse DFT modules 110 (or any DFT modules located after interpolation but prior to beamforming) and any beamforming may be performed in the frequency domain.

System 100 may further comprise a phase-steered digital beamformer 112 which is configured to receive the output from frequency-dependent interpolator 108, or in alternate embodiments, the output of inverse DFT modules 110, and process phase-only beamsteering according to methods known in the art, using the element spacing corrected data received from frequency-dependent interpolator 108 or DFT modules 110.

Figure 2:
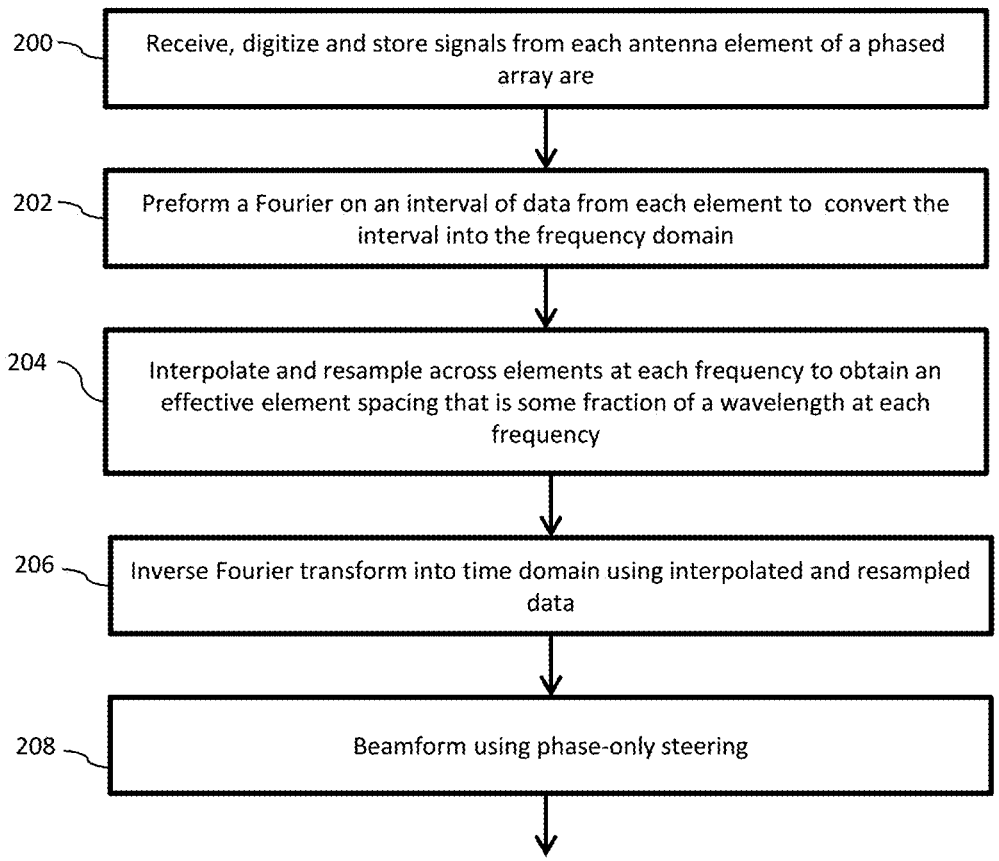
FIG. 2 shows a flowchart of a method that permits phase-only steering of a wideband signal according to an embodiment.

FIG. 2 shows a method to permit phase-only steering of wideband signals. As shown, in step 200, signals from each antenna element 102 of a phased array are received, digitized by A/D converters 104, and stored for further processing. The stored result of step 100 can be thought of as a matrix of data: time-by-element.

In step 202, an interval of data from each element may be Fourier transformed, by DFT modules 106, into the frequency domain. The results of this process may be thought of as a matrix of data: frequency-by-element. In exemplary embodiment, this interval may be one pulse repetition interval; however one of ordinary skill will appreciate that other intervals, including fixed time intervals, may be used.

In step 204, the data output in step 202 may be interpolated and resampled across elements at each frequency to obtain an effective element spacing that is some fraction of a wavelength at each frequency, according to the process performed by frequency-dependent interpolator 108. In exemplary embodiment, cubic spline interpolation may be used; however, in alternate embodiments, different interpolation algorithms, such as linear interpolation, that are sufficient for interpolating the data as described in step 204 may be used.

Figure 3:
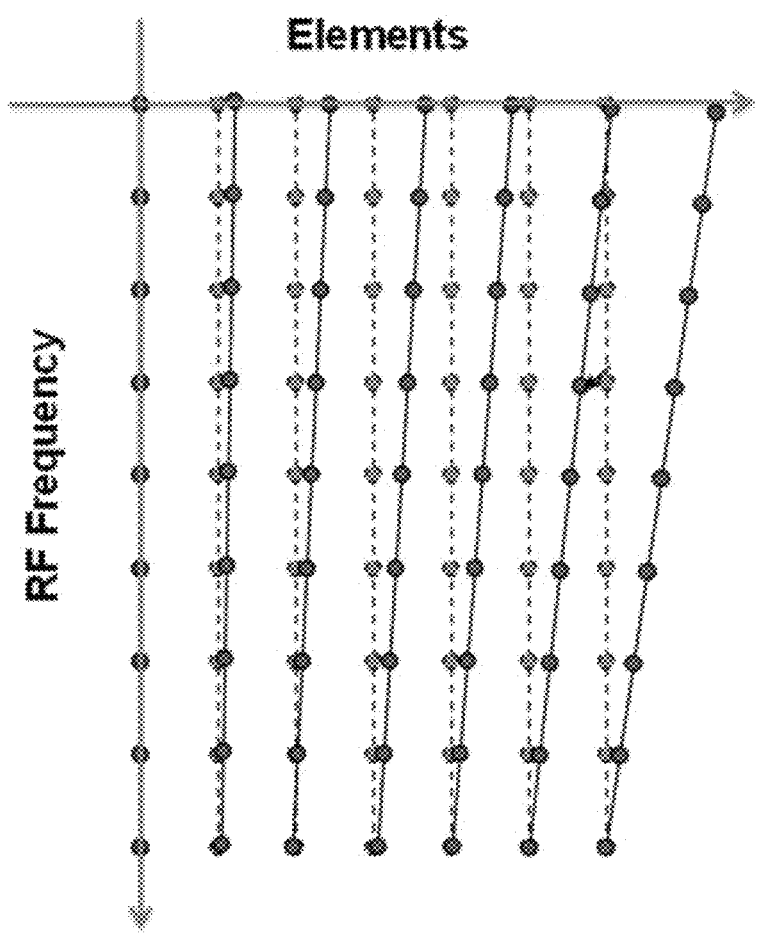
FIG. 3 shows a chart according to an embodiment.
Figure 4:
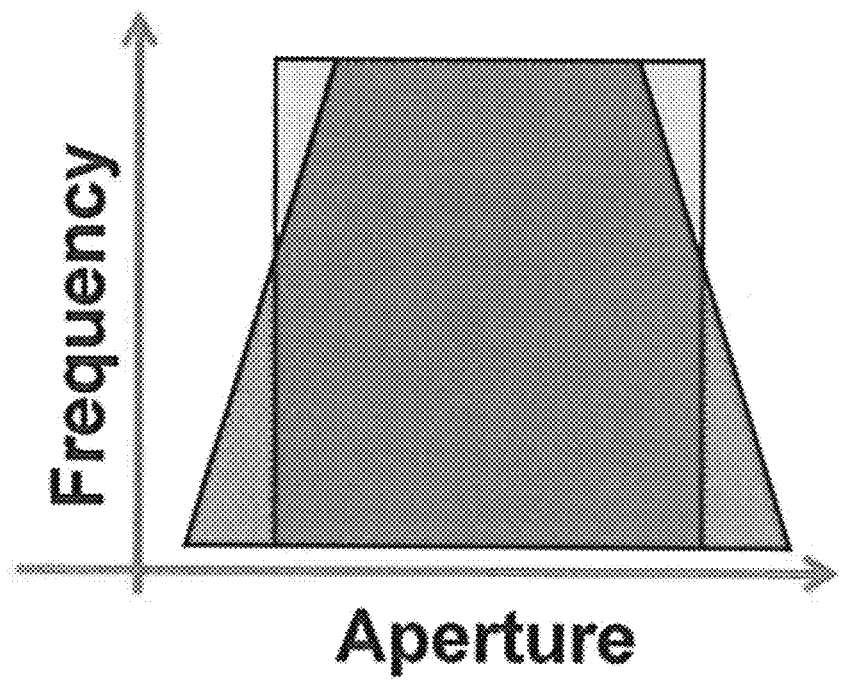
FIG. 4 shows a graph according to an embodiment.

FIG. 3 shows a chart of the of actual element spacing against the interpolated and resampled element spacing, versus fast frequency. As shown, the actual element spacing versus frequency is depicted as a set of data points connected by parallel lines, because the elements are spatially fixed in the array and do not, of course, change in frequency. The effective element spacing, as a result of the interpolation and resampling, is depicted as the darker data points deviating from the position of the actual elements. Note, at lower frequencies, the data points are interpolated to spread them out and have a larger apparent physical spacing (since lower frequencies have a longer wavelength). At higher frequencies, the data points are interpolated to have a smaller effective spacing. Relative to the equation above, $f_0$ is the highest frequency in this example. FIG. 4 shows the effective aperture length of the array versus frequency without the processing—a rectangle, overlaid over the effective aperture spacing following the interpolation and resampling, which forms the trapezoidal shape shown.

Figure 5A:
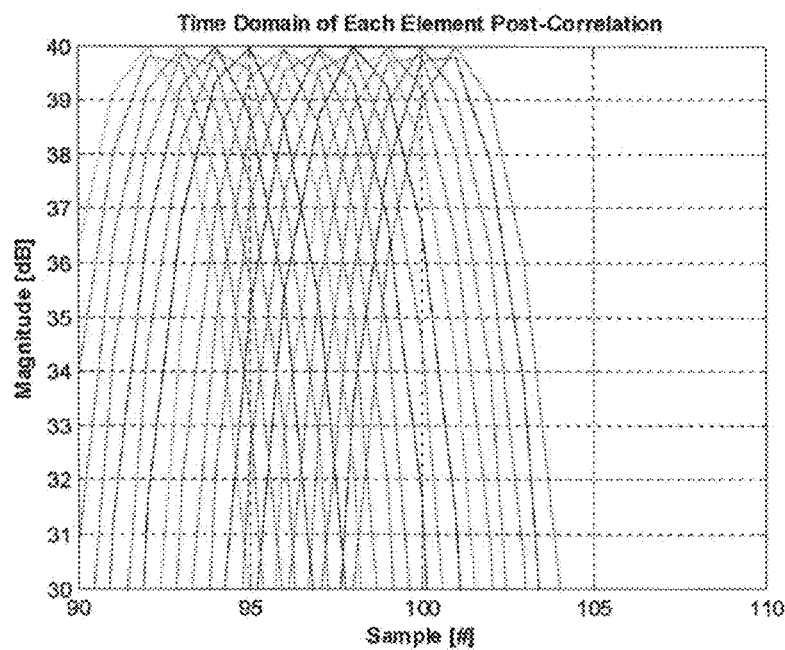
FIG. 5A shows a graph according to an embodiment.
Figure 5B:
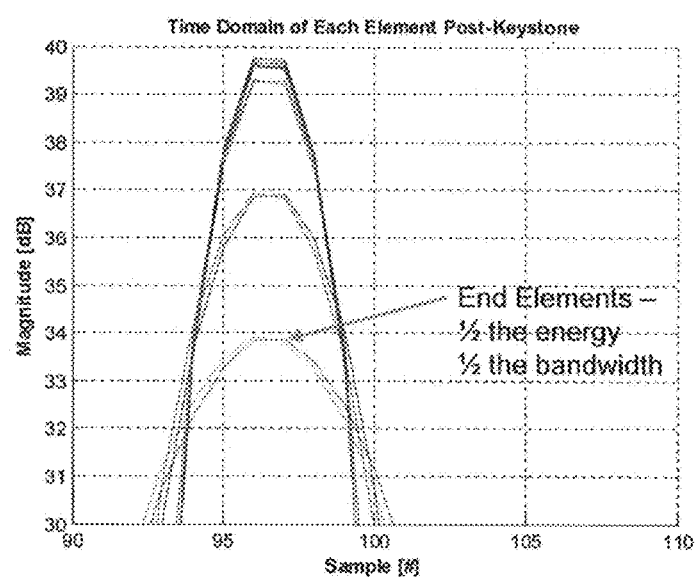
FIG. 5B shows a graph according to an embodiment.
Figure 6:
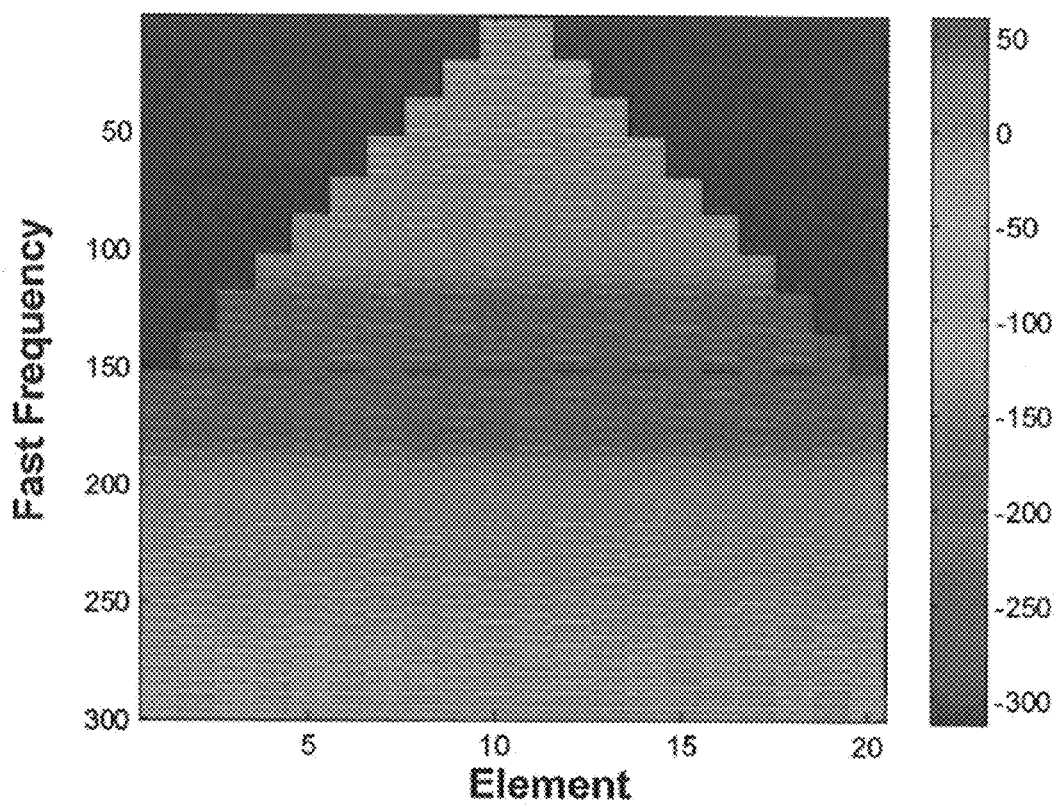
FIG. 6 shows a graph according to an embodiment.

FIG. 5A shows the time-domain of each element (of a 20 element array) following the analog to digital conversion and correlation (correlation, here, refers to compression such that a simple, unmodulated pulsed signal, with some bandwidth, is recovered). FIG. 5B shows the time domain of each element following the interpolation and resampling according to frequency. Notice that the time dispersion of the signal in FIG. 5A is eliminated by the interpolation/resampling step, which is key to wideband beamsteering and equivalent to a time-delay-steered beamformer. Similarly, FIG. 6 shows an example of the frequency domain support following the interpolation and resampling across each element.

Returning to FIG. 2, in step 206, the interpolated and resampled points are used in place of the original points and inverse Fourier transformed back to the time domain. And finally, in step 208, beams can now be formed with phase-only steering according to known methods in the art. In an alternate embodiment, step 206 may be skipped entirely and beamforming may be conducted in the frequency domain.

One of ordinary skill in the art will appreciate that this process can be reversed for transmitting a wideband signal, i.e. the signal is generated, phase steered, and distributed to each element. The signal is Fourier transformed, and interpolated and resampled using the inverse of the transformation described above. The resampled data are then inverse Fourier transformed per element and transmitted to form a wideband antenna beam.

Figure 7A:
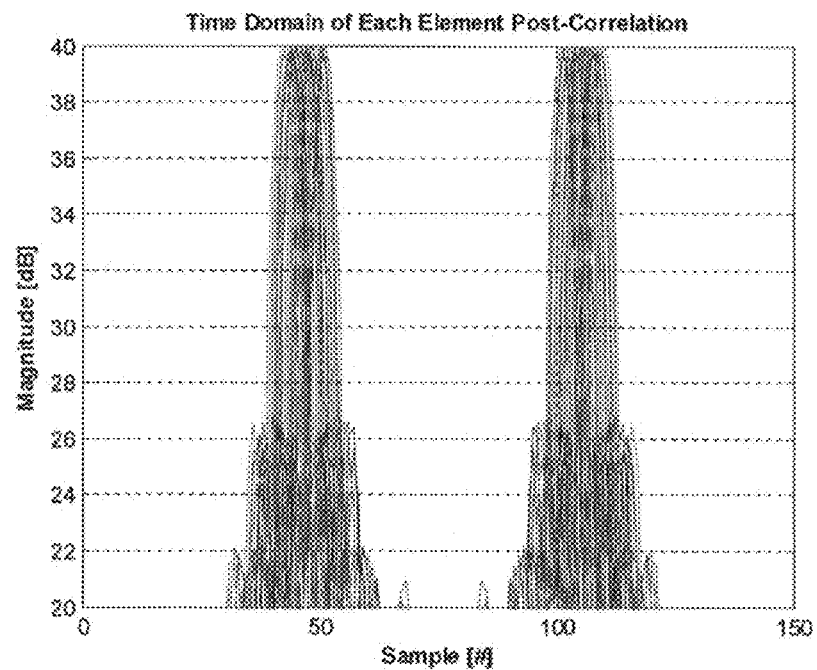
FIG. 7A shows a graph according to an embodiment.
Figure 7B:
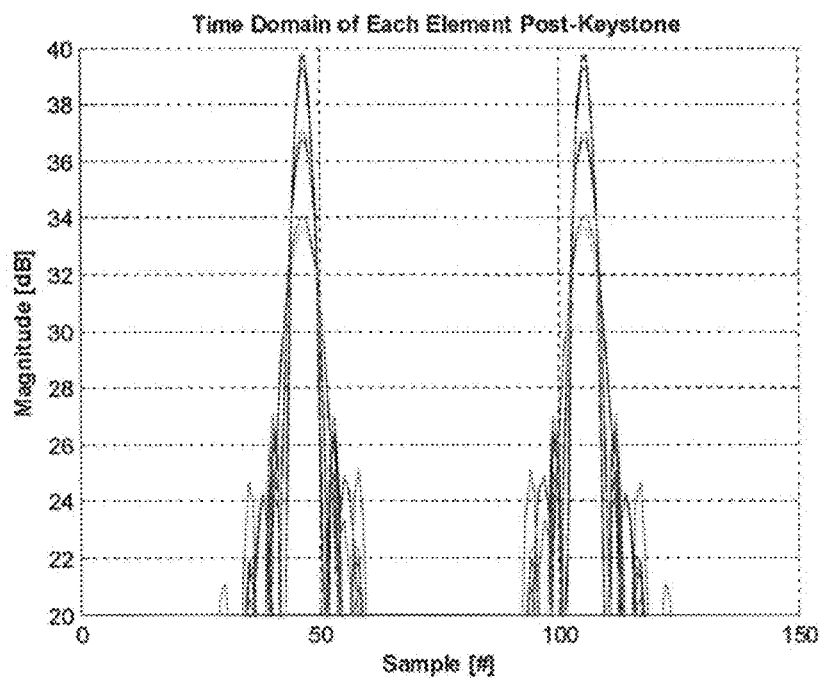
FIG. 7B shows a graph according to an embodiment.

System 100 may be further advantageously employed for multiple simultaneous beamforming or adaptive beamforming. FIGS. 7A and 7B show two signals coming from different angles in the time domain following correlation and following interpolation and resampling. The process has collapsed the time dispersion of both signals simultaneously, despite the fact that they arrive from different directions. The difference between this process and time-delay steering is that this process simultaneously collapses the dispersion of all signals coming from all unambiguous angles simultaneously, allowing subsequent wideband digital beamforming in any and all unambiguous directions.

A "module," as may be used herein, can include, among other things, the identification of specific functionality represented by specific computer software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for narrowing the beamwidth of a wideband phased array radar system, comprising the steps of:
   receiving a plurality of signals from a plurality of antenna elements having a predetermined spacing, wherein each signal comprises a plurality of frequencies;
   digitizing the plurality of received signals;
   inputting a portion of each of the digitized received signals from each element into a DFT processing module and receiving, for each signal, a plurality of frequency bins, each having a complex value and a frequency value, wherein the frequency bins above a reference frequency will exhibit an effective spacing that is smaller than the predetermined spacing, wherein the frequency bins below the reference frequency will be exhibit an effective spacing that is larger than the predetermined spacing;
   creating a plurality of interpolated complex values from the complex values of the frequency bins having the same frequency value from each element; and
   sampling the interpolated complex values such that the effective spacing at frequency bins higher than the reference frequency is increased and the effective spacing at frequency bins lower than the reference is decreased, such that a spatial resolution at the frequency value of the frequency bins interpolated is a desired fixed fraction of a wavelength of the signal at the frequency value of the frequency bins interpolated and the beamwidth of the wideband phased array radar system is narrowed.

2. The method of claim 1, further comprising the step of: repeating the steps of creating and sampling for each frequency value of the plurality of frequency bins.

3. The method of claim 2, further comprising the step of beam steering using the sampled interpolated complex values.

4. The method of claim 2, further comprising the step of inputting the sampled interpolated complex values into an inverse DFT module to receive a plurality of time-domain signals.

5. The method of claim 4, further comprising the step of phase-only beam steering of the plurality of time-domain signals.

6. The method of claim 1, wherein the interpolated complex values are sampled according to the following equation:

$$x = \left(\frac{f_o}{f + f_o}\right)x'$$

Where x is the antenna element spacing, x' is the desired spatial resolution, $f_o$ is a predetermined reference frequency of the signal and f is the frequency value of the frequency bins interpolated.

7. The method of claim 1, further comprising the step of compressing the received signals to uncover an unmodulated pulse signal.

8. A method for narrowing the beamwidth of a wideband phased array radar system, comprising the steps of:
   generating a plurality of digital signals comprising a plurality of frequencies;

inputting the plurality of digital signals to a DFT processing module and receiving, for each signal, a plurality of frequency bins, each having a complex value and a frequency value, wherein the frequency bins above a reference frequency will exhibit an effective spacing that is smaller than the predetermined spacing, wherein the frequency bins below the reference frequency will be exhibit an effective spacing that is larger than the predetermined spacing;

creating a plurality of interpolated complex values from the complex values of the frequency bins having the same frequency value and from separate signals;

sampling the interpolated values such that the effective spacing at frequency bins higher than the reference frequency is increased and the effective spacing at frequency bins lower than the reference is decreased, such that the spatial resolution at the frequency value of the frequency bins interpolated is a desired fraction of a wavelength of the signal at the frequency value of the frequency bins interpolated and the beamwidth of the wideband phased array radar system is narrowed;

phase-steering the time-domain signals; and transmitting each of the phase-steered time-domain signals from a plurality of antenna elements having a predetermined spacing.

9. The method of claim 8, wherein the interpolated complex values are sampled according to the following equation:

$$x = \left(\frac{f_o}{f+f_o}\right)x'$$

where x is the antenna element spacing, x' is the desired spatial resolution, $f_o$ is a predetermined reference frequency of the signal and f is the frequency value of the frequency bins interpolated.

10. A system for narrowing the beamwidth of a wideband phased array radar system, comprising:

an analog to digital converter configured to digitize a plurality of signal values received from a plurality of antenna elements having a predetermined spacing, wherein each of the signal values comprises a plurality of frequencies;

a DFT processing module configured to receive a portion of the digitized signal from each antenna element and to output, for each signal, a plurality of frequency bins, each having a complex value and a frequency value, wherein the frequency bins above a reference frequency will exhibit an effective spacing that is smaller than the predetermined spacing, wherein the frequency bins below the reference frequency will be exhibit an effective spacing that is larger than the predetermined spacing;

a frequency-dependent interpolator configured to create a plurality of interpolated complex values from the complex values of the frequency bins having the same frequency value and from separate signals, and configured to sample such that the effective spacing at frequency bins higher than the reference frequency is increased and the effective spacing at frequency bins lower than the reference is decreased, the interpolated values such a spatial resolution at the frequency value of the frequency bins interpolated is a desired fraction of a wavelength of the signal at the frequency value of the frequency bins interpolated and the beamwidth of the wideband phased array radar system is narrowed.

11. The system of claim 10, wherein the frequency-dependent interpolator repeats the steps of creating and sampling for each frequency value of the plurality of frequency bins.

12. The system of claim 11, further comprising a phase-steered digital beamformer configured to beam steer using the plurality of sampled interpolated complex values.

13. The system of claim 11, further comprising an inverse DFT module configured to convert the sampled interpolated complex values into a plurality of time-domain signals.

14. The system of claim 13, further comprising a phase-steered digital beamformer configured to perform phase-only beam steering using the plurality of time-domain signals.

15. The system of claim 10, wherein the interpolated complex values are sampled according to the following equation:

$$x = \left(\frac{f_o}{f+f_o}\right)x'$$

where x is the antenna element spacing, x' is desired spatial resolution, $f_o$ is a predetermined reference frequency of the signal and f is the frequency value of the frequency bins interpolated.

16. The system of claim 10, further comprising a compressor configured to compress the received signals to uncover an unmodulated pulse signal.

17. A system for narrowing the beamwidth of a wideband phased array radar system, comprising:

a signal generator configured to generate a plurality of digital signals comprising a plurality of frequencies;

a DFT processing module configured to receive a portion of the digitized signal from each antenna element and to output, for each signal, a plurality of frequency bins, each having a complex value and a frequency value wherein the frequency bins above a reference frequency will exhibit an effective spacing that is smaller than the predetermined spacing, wherein the frequency bins below the reference frequency will be exhibit an effective spacing that is larger than the predetermined spacing;

a frequency-dependent interpolator configured to create a plurality of interpolated values from the complex values of the frequency bins having the same frequency value and from separate signals, and configured to sample the interpolated values such that the effective spacing at frequency bins higher than the reference frequency is increased and the effective spacing at frequency bins lower than the reference is decreased, such that the spatial resolution at the frequency value of the frequency bins interpolated is a desired fraction of a wavelength of the signal at the frequency value of the frequency bins interpolated and the beamwidth of the wideband phased array radar system is narrowed;

a phase-steered digital beamformer configured to beam steer using the plurality of sampled interpolated values;

a plurality of antennas configured to transmit the plurality of beam steered sampled interpolated values.

18. The system of claim 17, wherein the interpolated complex values are sampled according to the following equation:

$$x = \left(\frac{f_o}{f + f_o}\right)x'$$

where x is the antenna element spacing, x' is the desired spatial resolution, $f_o$ is a predetermined reference frequency of the signal and f is the frequency value of the frequency bins interpolated.

\* \* \* \* \*